(12) United States Patent
Langer et al.

(10) Patent No.: US 8,876,427 B2
(45) Date of Patent: Nov. 4, 2014

(54) SPUR TOOTHING ON A COUPLING ELEMENT FOR TRANSMITTING TORQUES

(75) Inventors: Roland Langer, Schwanfeld (DE); Ernst Masur, Untereuerheim (DE); Ralf Heiss, Schweinfurt (DE); Benno Fueller, Karlstadt (DE); Peter Niebling, Bad Kissingen (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 1873 days.

(21) Appl. No.: 11/912,000

(22) PCT Filed: Apr. 19, 2006

(86) PCT No.: PCT/DE2006/000677
§ 371 (c)(1),
(2), (4) Date: Oct. 19, 2007

(87) PCT Pub. No.: WO2006/111140
PCT Pub. Date: Oct. 26, 2006

(65) Prior Publication Data
US 2008/0156610 A1    Jul. 3, 2008

(30) Foreign Application Priority Data
Apr. 20, 2005   (DE) .......................... 10 2005 018 127

(51) Int. Cl.
| B25G 3/28 | (2006.01) |
| F16D 1/076 | (2006.01) |
| F16D 1/072 | (2006.01) |
| B60B 27/00 | (2006.01) |

(52) U.S. Cl.
CPC ................ *F16D 1/076* (2013.01); *B60B 27/00* (2013.01); *F16D 1/072* (2013.01); *F16D 2250/00* (2013.01); *B60B 27/0031* (2013.01)
USPC ..................... 403/359.1; 301/105.1; 384/544; 464/178

(58) Field of Classification Search
USPC ................. 403/359.1; 192/69.8, 107 R, 108; 301/105.1; 464/149, 178, 182, 906; 384/542, 544, 562, 589
See application file for complete search history.

(56) References Cited

U.S. PATENT DOCUMENTS

| 1,245,813 A | 11/1917 | Smulski |
| 3,586,357 A | 6/1971 | Orain |
| 4,352,528 A | 10/1982 | Guimbretiere |
| 4,460,058 A * | 7/1984 | Welschof et al. ............. 180/258 |
| 4,473,129 A | 9/1984 | Guimbretiere |
| 4,493,388 A | 1/1985 | Welschof et al. |
| 4,576,503 A * | 3/1986 | Orain ............................ 403/259 |

(Continued)

FOREIGN PATENT DOCUMENTS

| DE | 7 36 689 C | 6/1943 |
| DE | 736689 | 6/1943 |

(Continued)

*Primary Examiner* — Gregory Binda
*Assistant Examiner* — Nahid Amiri
(74) *Attorney, Agent, or Firm* — Simpson & Simpson, PLLC

(57) ABSTRACT

The invention relates to a spur toothing on at least one coupling element for transmitting torques about a rotational axis, said spur toothing axially engaging with a corresponding mating cutting. The face cutting is provided with teeth from a material of the coupling element that has been plastically shaped in an at least partially non-cutting manner.

5 Claims, 3 Drawing Sheets

(56) References Cited

U.S. PATENT DOCUMENTS

| | | | | |
|---|---|---|---|---|
| 4,893,960 A | * | 1/1990 | Beier et al. | 403/24 |
| 5,240,333 A | * | 8/1993 | Hassiotis et al. | 384/448 |
| 5,536,098 A | * | 7/1996 | Schwarzler | 403/259 |
| 5,549,514 A | * | 8/1996 | Welschof | 464/145 |
| 5,799,766 A | | 9/1998 | Link et al. | |
| 6,022,275 A | * | 2/2000 | Bertetti | 464/178 |
| 6,241,635 B1 | * | 6/2001 | Schmid et al. | 474/11 |
| 6,442,992 B2 | * | 9/2002 | Tsubouchi et al. | 72/370.21 |
| 6,811,511 B2 | * | 11/2004 | Zeise | 475/248 |
| 7,118,182 B2 | * | 10/2006 | Kayama et al. | 301/105.1 |
| 7,195,399 B2 | * | 3/2007 | Myers et al. | 384/544 |

| | | |
|---|---|---|
| 2002/0187843 A1 | 12/2002 | Krude |

FOREIGN PATENT DOCUMENTS

| | | |
|---|---|---|
| DE | 31 34 913 A1 | 4/1982 |
| DE | 31 16 720 C1 | 10/1982 |
| DE | 31 16 775 A1 | 11/1982 |
| DE | 36 04 630 A1 | 8/1987 |
| DE | 36 36 243 X | 5/1988 |
| DE | 41 38 917 A1 | 11/1992 |
| DE | 4138917 | 11/1992 |
| GB | 20 47 846 A | 12/1980 |
| GB | 2186534 | 8/1987 |

* cited by examiner

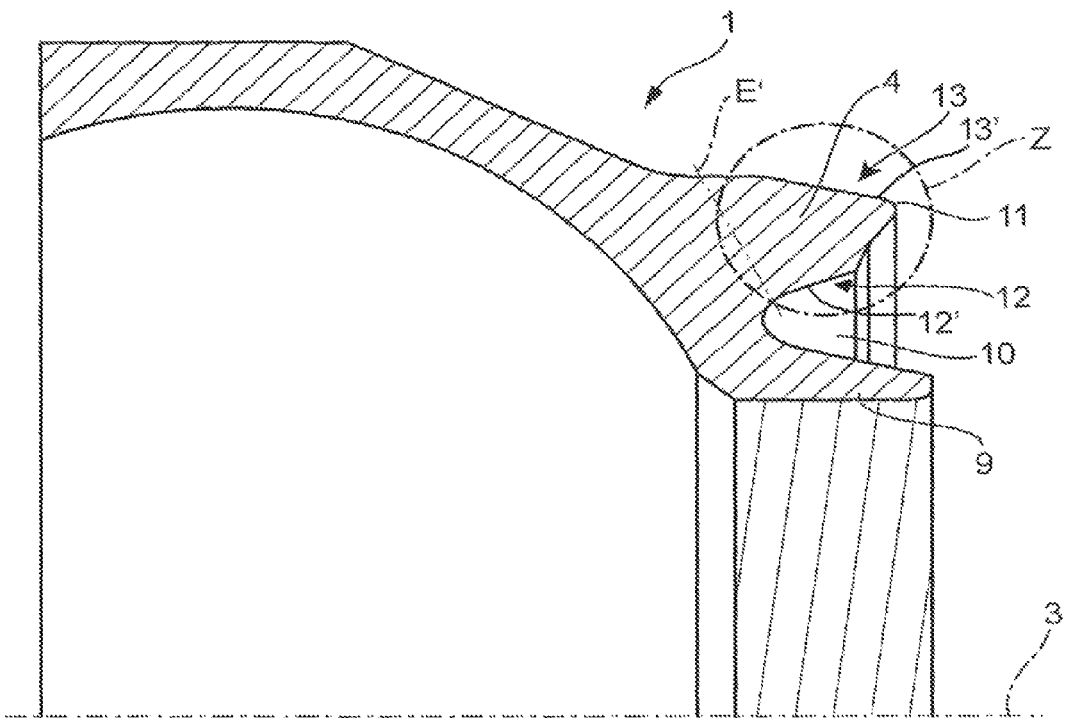
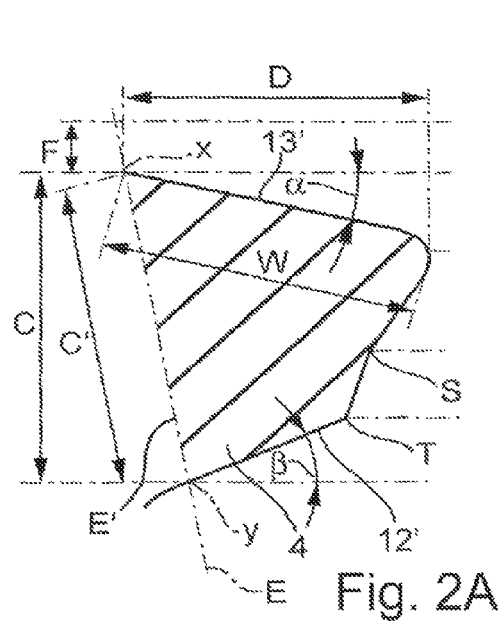
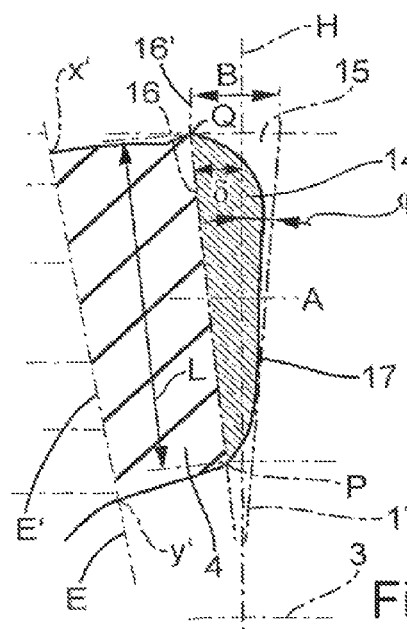
Fig. 1
Fig. 2A
Fig. 2B

SPUR TOOTHING ON A COUPLING ELEMENT FOR TRANSMITTING TORQUES

This application is a 371 of PCT/DE2006/000677 filed Apr. 19, 2006, which in turn claims the priority of DE 10 2005 018 127.9 filed Apr. 20, 2005, the priority of both applications is hereby claimed and both applications are incorporated by reference herein.

FIELD OF THE INVENTION

The invention relates to a spur toothing on at least one coupling element for transmitting torques about a rotational axis, with the spur toothing engaging axially into a corresponding mating toothing, the spur toothing having teeth composed of material, which is at least partially plastically formed in a non-cutting process, of the coupling element.

BACKGROUND OF THE INVENTION

A spur toothing of said type is provided, for example according to DE 36 36 243 A1, in a wheel bearing unit. In the wheel bearing unit, a hub is rotatably mounted by means of a wheel bearing. The hub is connected rotationally fixed connected to a vehicle wheel and can be driven by a cardan shaft arrangement. In the case considered, the hub is coupled to the cardan shaft arrangement. Provided as a coupling element is the bell of a joint, on which bell the spur toothing is formed. The spur toothing faces axially toward a corresponding mating toothing. The mating toothing is likewise a spur toothing and is formed directly on the hub or on an inner ring, which is seated on the hub, of the wheel bearing. The spur toothings engage into one another axially and are clamped to one another axially. By means of said connection, torques about the rotational axis from the cardan shaft arrangement to the hub and therefore to the vehicle wheel, or in the inverse direction are transmittable. The toothings are generally clamped to one another axially in such a way that the tooth flanks are uniformly loaded. This assumes, however, that the geometry of the toothing is formed very precisely, so that the load-bearing component which acts axially and at the peripheral side is very high.

It is provided according to DE 36 36 243 A1 that the spur toothings are formed by cold-forming of certain regions of the material of the coupling elements. For this purpose, the material is plastically displaced by feeding forming dies from the axial direction and partially also by pivoting the dies relative to the rotational axis in the radial direction. The resistance of the material against displacement is particularly high, especially at the coupling element of the cardan shaft arrangement, since the material must be formed directly out of the surface of the coupling element and therefore out of a relatively large and solid material accumulation. The forces required for the forming process are very high. Machines having the correspondingly high required power are expensive. It is difficult to form individual teeth of the toothing with the required accuracy and with a high load-bearing component of the teeth, since a large part of the material escapes radially outward on account of the high forming forces, and does not flow into the forming die.

SUMMARY OF THE INVENTION

It is therefore the object of the invention to create a spur toothing with a high load-bearing component which can be produced cost-effectively.

The object is achieved in that the spur toothing is formed on at least one section which projects axially out of the coupling element. The section, of any desired shape, has the teeth of the spur toothing at least proportionally on an axial end side. The spur toothing can also be the mating toothing of the further coupling element in the torque coupling.

The section, which is preferably formed in one piece with the coupling element, is designed such that, during the forming process, only the material which is required for forming the toothing must be displaced. Further material of the coupling element no longer hinders the forming process, since initially the accumulation of the material is restricted to a minimum. The forces required for the forming process are reduced. It is possible in a cost-effective manner to use machines with lower power characteristics. The teeth are formed better and have a higher load-bearing component.

The invention relates to all couplings for transmitting rotational movements and torques in which at least two coupling elements engage into one another by means of axial spur toothings—preferably torque couplings in wheel bearing units which have a hub which is driven by means of a cardan shaft arrangement.

The geometry of the section is arbitrary. It is thus conceivable for the section to be centered with respect to the rotational axis on a substantially rotationally symmetrical coupling element and formed so as to be rotationally symmetrical about said rotational axis, for example as a truncated cone.

One embodiment of the invention provides that the section runs annularly in a rotationally symmetrical fashion around the rotational axis. This is particularly advantageous, if an axially open annular groove is formed radially between the section, which projects axially out of the coupling element, and a part of the coupling element, that is to say if the annular section concentrically surrounds at least a part of the coupling element.

Further embodiments of the invention relate to the geometric design of the section before forming. It is thus provided that, before the forming of the teeth, the section is delimited at least radially by contours which converge on one another radially, and therefore narrows in cross section in one direction. At the narrower regions of the section, less material must be displaced during the forming. The small amount of material flows in a controlled fashion into the die molds and does not escape in an uncontrolled fashion. With designs of said type, it is therefore possible to influence the precision and the quality of the forming process in a targeted fashion.

The section is preferably designed such that the contours, from the point where the section projects axially from the coupling element, converge on one another radially to an increasing degree in the direction of the end side. The contours are outlined, in arbitrary longitudinal sections which are aligned axially along the rotational axis, initially by contour lines which are situated opposite one another radially and which converge on one another toward the end side.

In one possible embodiment of the section, the radially outer contour line in longitudinal section initially runs so as to taper toward the rotational axis in the direction of the end side, and ultimately merges at the end side into a radially inner contour line. This is for example the case when, on an annular section, the outer diameter of the radial outer contour narrows to an increasing degree in the direction of the end side in a continuously linear fashion, a degressive fashion or with an arbitrarily varying profile.

It is also provided that a radially inner contour line in longitudinal section initially runs so as to rise above the rotational axis in the direction of the end side, and then merges at the end side into a radially outer contour line. This is the case when the inner diameter of an annular section becomes larger in the direction of the end side in a continuously linear fashion, or a degressive or progressive fashion, or with an arbitrarily varying profile.

It is advantageous if both of the above-stated profiles are realized simultaneously on one section.

The material which is to be displaced becomes increasingly less with decreasing distance from the end side. When the forming die strikes the end side, initially a small amount of material is displaced. The material therefore provides little resistance to the forming process at the start and does not escape into the forming die and to the side.

The material does not flow outward unintended but rather into the forming die, and is then distributed in the forming die at least partially in the radial directions. The forming die is filled with the material more effectively. The closer the forming die approaches the base axially, the greater the resistance to the flow. The base is the transition at which the section projects from or merges into the mass of the material of the coupling element. The material which is situated in the die is distributed uniformly in the forming die and fills up the latter almost completely. The shape of the teeth on the finished toothing is accordingly better formed.

The shape of the teeth is of optimal design if, before the forming of the teeth, the outline of the section is delimited by the contours, as already described above, which converge on one another radially. The dimensions of the section before the forming and the dimensions of the teeth after the forming are in a predetermined ratio. It is thus provided with one embodiment of the invention that, before the forming of the teeth, the greatest spacing between the contours is where the section projects from the coupling element. The smallest overall length of the formed teeth considered in the axial projection is greater than the greatest spacing in the axial projection by at most ⅕ of the greatest spacing, considered in the axial projection, between the contours. The overall length considered in the projection can also be smaller than or equal to the axial spacing in the axial projection. The overall length is measured in the tooth root plane of the spur toothing.

Alternatively or at the same time, before the forming of the teeth, the section is at least twice as long in the radial projection as the theoretical tooth height of the formed teeth. In this case, the greatest spacing between the end side and the base at which the section projects axially from the coupling element is projected into the radial projection. The theoretical tooth height is the greatest measured axial spacing between the tooth root plane and the tooth tip plane in a forming die for forming the teeth.

As a result of the invention, it is possible by means of the finished nominal dimensions of the individual teeth and/or of the toothing to design the blank in the form of the section in a simple manner with regard to the forming forces and the material flow.

In this case, a spur toothing and its teeth are to be understood to mean any arrangement of ridges which are adjacent to one another and project axially on the end side, which cooperate in an orderly or arbitrary manner in the vicinity with axial depressions (for example tooth gaps) between the elevations, and which correspond with a corresponding mating toothing. The known form of spur toothing is preferably provided, in which teeth and tooth gaps of the teeth are arranged adjacent to one another at the peripheral side and are aligned radially lengthwise. The toothing is preferably produced by means of cold forming from steel; also conceivable, however, is the use of all further conceivable forming processes, the use of light metals or light metal alloys and plastics.

Also provided is cutting finishing of the teeth after the forming process.

BRIEF DESCRIPTION OF THE DRAWINGS

The present invention will be further understood and appreciated by reading the following description in conjunction with the accompanying drawings, in which:

FIG. 1 is a partial cross-sectional view of a coupling element of the present invention;

FIG. 2A is a partial cross-sectional view showing detail Z of a section of the coupling element from FIG. 1 before forming of the toothing;

FIG. 2B is a partial cross-sectional view showing detail Z of a section of the coupling element from FIG. 1 after forming of the toothing;

DETAILED DESCRIPTION OF THE INVENTION

The invention is explained in more detail below on the basis of exemplary embodiments.

Figure 3:
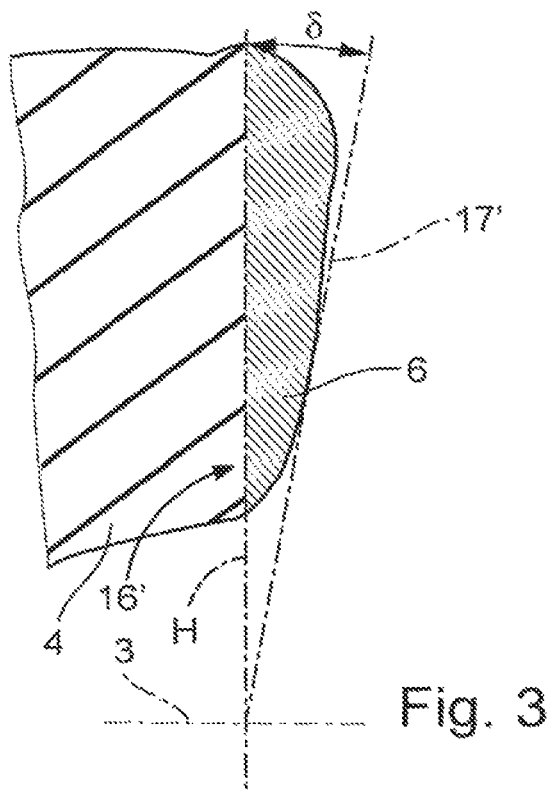
FIG. 3 is a partial cross-sectional view of an alternative embodiment of the section.

FIG. 1 shows an exemplary embodiment of a coupling element 1 in the form of a joint bell in a cardan shaft arrangement (not illustrated in any more detail). The joint bell, which is formed so as to be substantially rotationally symmetrical about the rotational axis 3, is illustrated partially in a longitudinal section axially along the rotational axis 3. The coupling element 1 is provided with a section 4 which, in FIG. 1, is illustrated in an initial state before the forming process and, in FIGS. 3, 4 and 5, with the toothing 5, 6 or 7 integrally formed thereon.

The section 4 is an annular bead which, on a base E', projects axially in one piece from the material of the joint bell 2 and whose axis of symmetry lies on the rotational axis 3. Formed radially between the section 4 and a part 9 of the coupling element 1 is an annular groove 10. The annular groove 10 is open in the axial direction in which the end side 11 on the section 4 points.

The section 4 is delimited radially by contours 12 and 13 which converge on one another. The contours 12 and 13 proceed from the points X and Y. The plane E which runs through the points X and Y is in this case considered as the base E' of the section 4 at which the section 4 merges into the coupling element 1. The contour 12 is described by the contour lines 12' and 13' in the longitudinal sections along the rotational axis 3 as per FIGS. 1, 2, 3 and 4. The radially outward-running outer contour line 13' is situated radially opposite the radially inwardly running inner contour line 12' at least until the contour lines 12' and 13' merge into one another radially at the end side 11.

FIGS. 2A and 2B show, as a comparison, and illustrated not to scale and enlarged, the detail Z of the section 4 from FIG. 1 before the forming of the toothing 5 (FIG. 2A), and the section 4, which has been formed by means of cold forming, having the toothing 5 (FIG. 2B).

Proceeding from X, the contour line 13' runs initially as a straight line inclined by the angle $\alpha$ in the direction of the rotational axis. The angle $\alpha$ is preferably $5° < \alpha < 20°$. In the further profile, the contour line 13' curves in the direction of the rotational axis and merges into the contour line 12'. The contour line 12 rises as a straight line proceeding from Y and is inclined with respect to the rotational axis by the angle $\beta$. The angle $\beta$ is preferably $15° < \beta < 30°$. In the further profile, the contour line 12' bends from the point T and runs with a steeper ascent, as well as from the point S with a shallower ascent, and finally curves in the radial direction in order to merge into the contour line 13'. It is alternatively also conceivable that the contour lines 12' and 13' are described, instead of by straight lines, by curved profiles or by combinations of straight lines and curved profiles.

The dotted lines 16 and 17 in the illustration with the formed teeth 14 of the toothing 5 indicate, in a highly schematized fashion, the contours of a negative form 15 of the die for an individual tooth 14. The negative form 15 is theoretically completely filled with material which has been displaced out of the section 4. The line 16 delimits the tooth root and therefore also represents, in the illustration, a tooth root plane 16 which runs through the points P and Q. The tooth root plane 16' is the transition at which the tooth 14 merges into the section 4 and at the same time marks, in the view, the apex in the base of the tooth gaps. The line 17 marks the theoretical tooth tip line or tooth tip plane 17'.

The greatest spacing C' between the contours 12 and 13 before the forming of the teeth is in the base E' between the points X and Y. In the axial projection, the path C' results in the spacing C. The overall length of the teeth L is, in the tooth root plane 16', the path L between the points P and Q. The axial projection of L is the path A. According to one embodiment of the invention, it is provided that the path A is greater than the path C by at most one-seventh. The points X and Y accordingly barely move in the axial direction during the forming of the teeth. The material which is plastically displaced during the forming therefore flows, in order to form the tooth 14, almost exclusively into the negative form 15.

The greatest length W of the section 4, reflected in the radial projection D before the forming of the teeth 14 is at least twice as long as the theoretical tooth height B of the formed teeth 14. The greatest spacing W between the end side 11 and the base E' is projected into the radial projection. The theoretical tooth height B is the greatest measured axial spacing B between the tooth root plane 16' and the tooth tip plane 17' in a forming die for forming the teeth.

The tooth root plane 16' of the toothing 5 is, in the longitudinal section according to FIG. 2, inclined counterclockwise at an acute angle δ away from the plane H. The plane H is the plane which is penetrated perpendicularly by the rotational axis 3. The tooth tip plane 17' is inclined clockwise by the acute angle φ with respect to the plane H. In the illustration according to FIG. 3, of an alternative embodiment of the section 4 after the forming of a toothing 6, the tooth root plane 16' lies in the plane H and is therefore penetrated perpendicularly by the rotational axis 3. The tooth tip plane 17' is, in this case, inclined clockwise by the acute angle φ away from the tooth root plane 16' and therefore from the plane.

Figure 4:
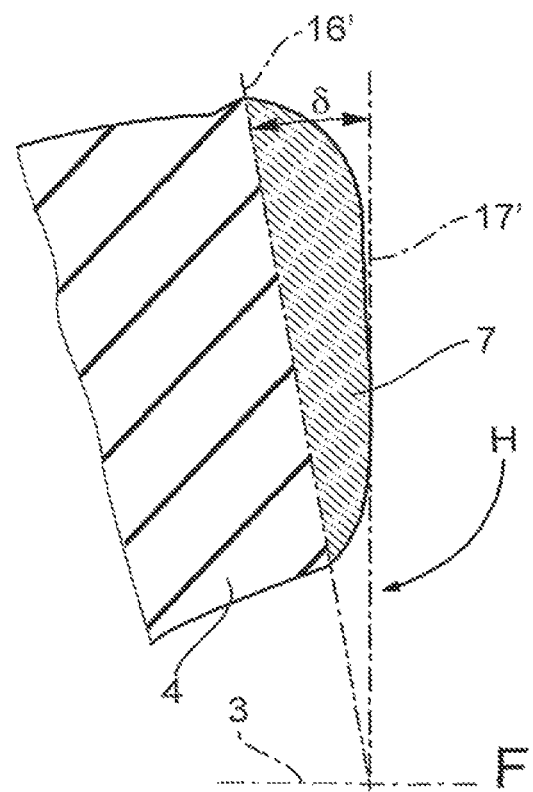
FIG. 4 is a partial cross-sectional view of a further alternative embodiment of the section.

In the illustration according to FIG. 4, the tooth tip plane 17' of a toothing 7 is penetrated perpendicularly by the rotational axis 3 and therefore lies in the plane H. The tooth root plane 16' is in this case inclined counterclockwise at an acute angle δ away from the tooth root plane 17'.

Figure 5:
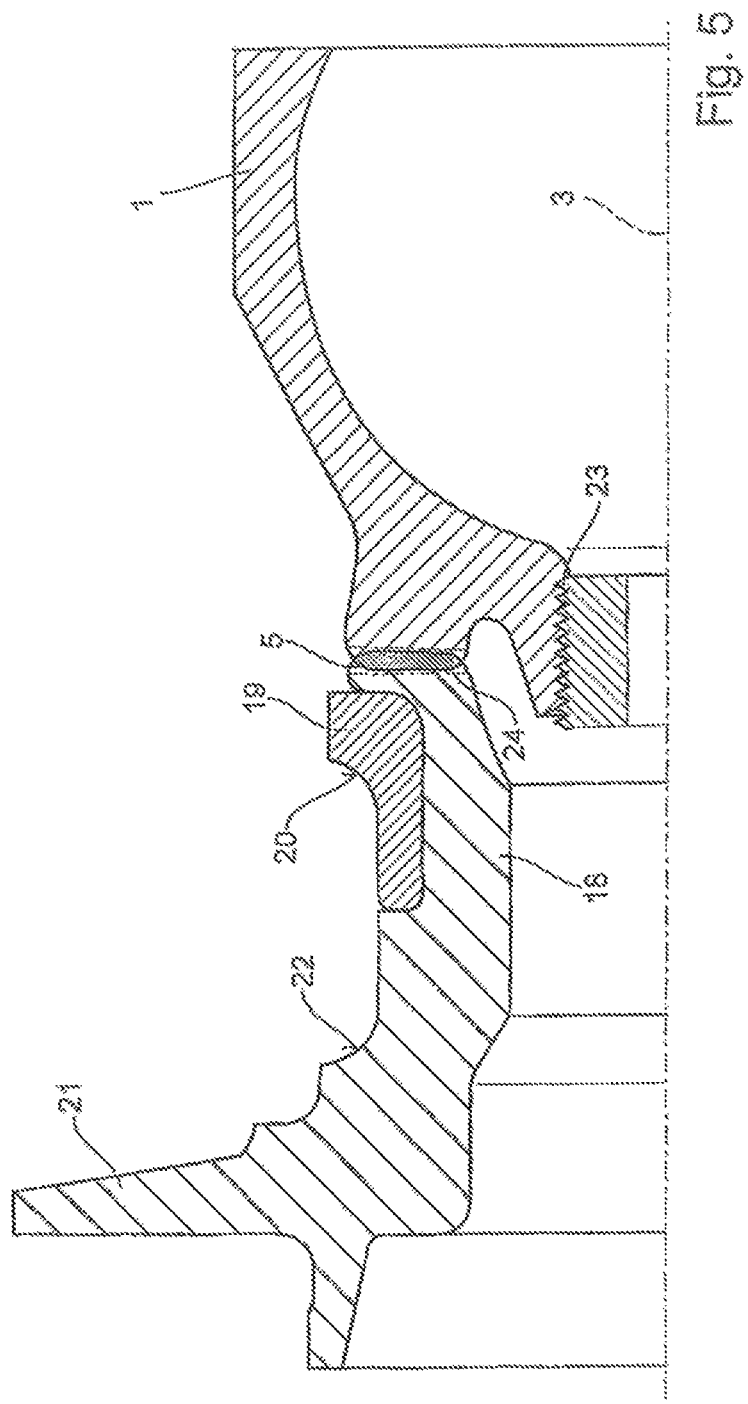
FIG. 5 is a cross-sectional view of the coupling element fixed to a hub.

FIG. 5 shows, in a longitudinal section, how the coupling element 1 in the form of the joint bell is coupled rotationally fixed to a hub 18. The hub 18 is part of a wheel bearing unit, of which only an inner ring 19 with a raceway 20 for rolling bodies, and a flange 21 on the hub 18 for fastening a vehicle wheel (not illustrated), are illustrated. A further raceway 22 for a further row of rolling bodies is formed on the flange 21. The hub 18 is coupled to the coupling element 1. For this purpose, the toothing 5 and a corresponding mating toothing 24 engage axially into one another and are clamped to one another axially by means of screw elements 23. Torques about the rotational axis 3 can be transmitted between the coupling element 1 and the hub 18.

| List of reference symbols | |
|---|---|
| 1 | Coupling element |
| 3 | Rotational axis |
| 4 | Section |
| 5 | Spur toothing |
| 6 | Spur toothing |
| 7 | Spur toothing |
| 8 | Axis of symmetry |
| 9 | Part |
| 10 | Annular groove |
| 11 | End side |
| 12 | Contour |
| 12' | Contour line |
| 13 | Contour |
| 13' | Contour line |
| 14 | Tooth |
| 15 | Negative form |
| 16 | Line |
| 16' | Tooth root plane |
| 17 | Line |
| 17' | Tooth tip plane |
| 18 | Hub |
| 19 | Inner ring |
| 20 | Raceway |
| 21 | Flange |
| 22 | Raceway |
| 23 | Screw element |
| 24 | Mating toothing |

The invention claimed is:

1. In a coupling element having a spur toothing formed on the coupling element for transmitting torque about a rotational axis, the spur toothing engagable axially into a corresponding mating toothing, the improvement comprising:
spur teeth comprised of plastically formable material,
wherein the spur teeth are formed on a first section that comprises an annular bead which projects axially outwardly from a base on the coupling element and which has the teeth at least proportionally on an axial end side, which faces axially outwardly from the coupling element in the direction of the rotational axis and the first section projects such that an axially open annular groove is formed radially between the first section and a second section which projects axially outwardly from the coupling element, the second section being spaced radially inwardly from the first section, the second section extends axially and radially outwardly from the coupling element so as to form the open annular groove radially between the first and second sections, and
the base has a spacing between a radially outer contour of the first section and a radially inner contour of the first section, and the teeth have an overall length in a tooth root plane, wherein an axial projection of the overall length of the teeth is greater than an axial projection of the spacing of the base.

2. The coupling element as claimed in claim 1, wherein the first section is formed in a materially integral fashion with the coupling element.

3. The coupling element as claimed in claim 1, wherein the first section runs annularly in a rotationally symmetrical fashion around the rotational axis.

4. The coupling element as claimed in claim 1, wherein the first section runs annularly in a rotationally symmetrical fashion around the rotational axis.

5. An assembly, comprising:
a coupling element, which is rotatable about a rotational axis, having a first section and a second section spaced radially inward of the first section, the first section, which comprises an annular bead that extends axially outwardly from a base on the coupling element in the direction of the rotational axis, has a radially outer contour, a radially inner contour spaced from the radially outer contour and an end surface facing axially outwardly in the direction of the rotational axis connecting the radially outer contour and the radially inner contour, a spur toothing, which has teeth comprising a plastically formable material, is formed on the end surface of the first section, the second section extends axially outwardly in a same direction as the first section, and an annular recess is formed radially between the first section and the second section, wherein the base has a spacing between the radially outer contour and the radially inner contour of the first section, and the teeth have an overall length in a tooth root plane, wherein an axial projection of the overall length of the teeth is greater than an axial projection of the spacing of the base; and a wheel bearing unit having a hub with a mating toothing formed on an axial end side of the hub, the spur toothing and the mating toothing being rotatably engagable such that a torque is transmitted about a rotation axis of the assembly.

\* \* \* \* \*